April 15, 1947.  H. STOCK  2,418,958
BLADE CHOPPER
Filed Feb. 5, 1945
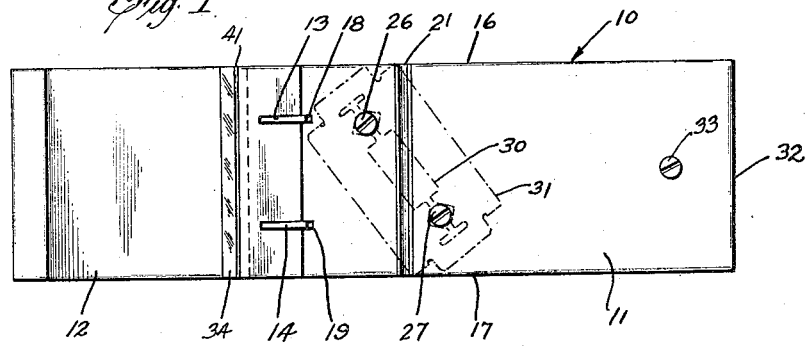
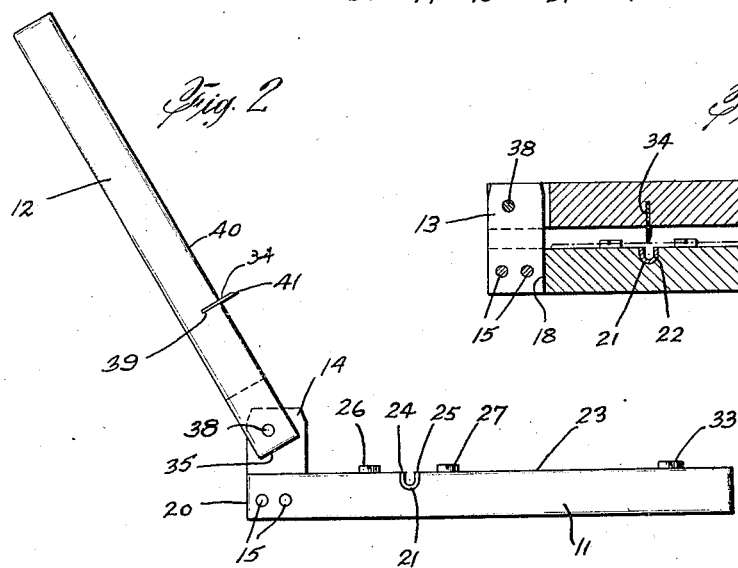
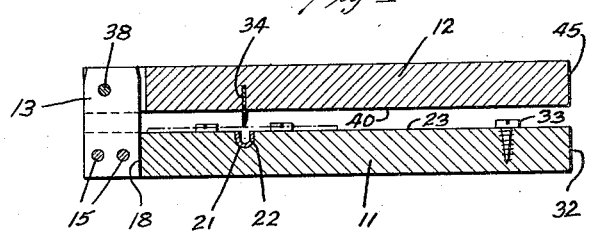
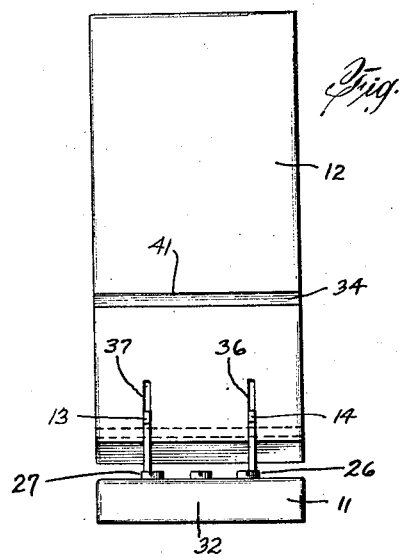
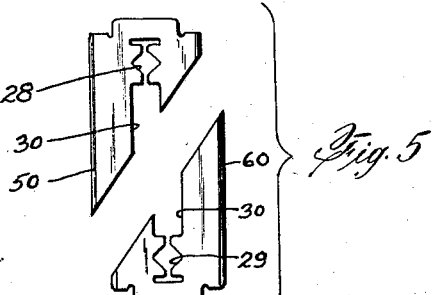
Herman Stock
INVENTOR.
BY Richard S. Temko
attorney Patented Apr. 15, 1947

2,418,958

UNITED STATES PATENT OFFICE 2,418,958

BLADE CHOPPER

Herman Stock, New York, N. Y.

Application February 5, 1945, Serial No. 576,163

2 Claims. (Cl. 29—66)

This invention relates generally to cutting or severing devices and more particularly a device especially adapted for the severing or cutting of a safety razor blade of the double edge type. It is known to diagonally bisect a double edge razor blade for the purpose of producing two separate cutting elements, each having a single cutting edge and such cutting elements are especially useful for fine operations. Such cutting elements may, for example, be used in conjunction with the furrier's knife disclosed in my Patent No. 2,313,598 granted March 9, 1943.

Since the blades are relatively thin and are of course inexpensive, it is desirable that they may be formed in a rapid and convenient manner and it is among the objects of the present invention to provide a device for this purpose, which I refer to as a blade chopper.

Another object of the present invention lies in the provision of a blade chopper structure which severs the double edge blade along a substantially rectilinear line producing two substantially identical cutting elements.

Another object herein lies in the provision of simple means for the prevention of the shifting in position of the blade prior to and during the cutting operation.

In accordance with the best operation of the device, the double edge safety razor blade may be more properly described as being broken rather than cut since a true shearing action in the blade chopper is not obtained. The lack of a shearing action prevents undesirable wear on the blade breaking elements so that they maintain a substantially uniform shape and position, resulting in a corresponding uniformity of the finished blade elements.

Another object herein lies in the provision of a device of the class described wherein a smooth and effective blade breaking action is obtained so that the blade breaks substantially instantaneously with a snap.

A still further object lies in the arrangement and co-action of the parts whereby the device may be manufactured at relatively low cost and may have a consequent wide sale and use.

These objects and other incidental ends and advantages will more fully appear in the progress of this disclosure and be pointed out in the appended claims.

In the drawings in which similar reference characters designate corresponding parts throughout the several views:

Figure 1 is a top plan view of an embodiment of the invention in a partially opened condition. Figure 1 is a top plan view of Figure 2.

Figure 2 is a side elevational view of the device as seen from the bottom of Figure 1.

Figure 3 is a front end elevational view as seen from the right of Figure 1.

Figure 4 is a longitudinal vertical sectional view of the device showing the parts at the inception of the blade breaking movement.

Figure 5 is a plan view of a double edge razor blade after having been broken to form two blade elements.

In accordance with the invention the blade breaker or chopper indicated generally by reference character 10, includes a base 11 and a cover 12.

The base 11 is preferably oblong in shape and is provided with a pair of uprights 13 and 14. The uprights 13 and 14 are preferably integrated with the base 11 by opposed pairs of pins 15 which extend inwardly from the outer longitudinal side edges 16 and 17 to engage correspondingly positioned orifices in the lower portions of the uprights 13 and 14. The plural pins 15 prevent rotation of the parts 13 and 14, and said uprights are given lateral support by being positioned between slots 18 and 19, which extend forwardly from the rear edge 20 of the base 11.

Forwardly of the uprights 13 and 14 a blade supporting trough 21 substantially U-shaped in cross-section, is supported within a transverse groove 22 in the upper surface 23 of the base 11. The blade supporting trough 21 is preferably composed of metal such as steel and the upper edges thereof 24 and 25 are substantially flush with the upper surface 23.

Blade locating pins 26 and 27 are disposed rearwardly and forwardly, respectively, of the trough 21 and they are laterally offset with respect to each other so that the distance between them is substantially equal to the distance between the pin engaging portions 28 and 29 of the blade slot 30. The position of the pins 26 and 27 is preferably such that a double edge blade generally indicated by reference character 31 when engaged thereupon, will take the position indicated by the dot dash lines in Figure 1.

Located preferably upon a longitudinal axis of the base 11 and inwardly from the front edge 32 of the base 11, is an enlargement or stop means 33 adapted to control the limit of movement of the cover 12 towards the closed position thereof and hence the degree of penetration of the blade chopping or breaking element 34. Means 33 may be rotated to affect vertical position.

The cover 12 is preferably of substantially uniform dimensions with respect to the base so that the device 10 may be easily carried in the pocket of the user when not in use. The rear edge 35 of the cover 12 is provided with a pair of spaced and parallel inwardly directed slots 36 and 37 which are of such width as to be a close sliding fit upon the uprights 13 and 14 which are disposed therewithin. The length of the slots 36 and 37 is sufficient to allow the cover to be completely rotatable about the pivot pin 38 which penetrates aligned orifices in said uprights and in the rear portion of the cover 12.

The blade chopping or breaking element 34 is preferably secured in a transverse slot 39 in the under surface 40 of the cover 12 and is so located that when the cover 12 is in the closed position thereof, that is to say, with the under surface 40 in contact with the upper surface of the stop means 33, the element 34 will be disposed within the blade supporting trough 21 with the lowermost or cutting edge 41 below the edges 24 and 25, a distance sufficient to distort the blade 31 thereat beyond its elastic limit.

The operation of the present device is a relatively simple quick and convenient matter. In order to break or chop the blade, it becomes necessary only to place it in the position shown by the dot dash lines on Figure 1 and to bring the cover down arcuately about the pin 38 until the parts take the position shown in Figure 4. Further downward pressure upon the cover causes the blade to be distorted into the trough 21 where it becomes severed along the edge 41 with a snapping action as the under surface 40 abuts against the top surface of the stop means 33. Elevating the cover places the now severed blade cutting elements 50 and 60 in clear view so that they may be removed easily without cutting the user's fingers. The cover 12 has a lever action and since the distance between the element 34 and the pivot 38 is less than the distance between the front edge 45 of the cover 12 and the pivot 38, the mechanical advantage obtained enables a relatively light pressure to break along a substantially predetermined line even the heavier types of razor blades with which the device is adapted to be used.

I wish it to be understood that I do not desire to be limited to the exact details of construction shown and described, for obvious modifications will occur to a person skilled in the art.

I claim:

1. A chopper for use in severing a razor blade of the double edge type, comprising: an elongated base having a transverse groove, a trough substantially U-shaped in section disposed within said groove, the upper edges of said trough being substantially flush with the upper surface of the base; a pair of locating pins projecting from said base, located on opposite sides of said trough, and laterally offset in opposite directions from the longitudinal axis of the base so as to position the razor blade diagonally with respect to the trough; a cover substantially coextensive with the base and pivotally connected at one end thereof to said base, overlying said blade when the latter is in position on said locating pins; a blade severing element projecting downwardly from the bottom surface of the cover and adapted in one position thereof to clear said trough and in another position to lie within the trough between the vertical portions thereof; and means disposed between the cover and the base to prevent the severing element from contacting the bottom of the trough; whereby downward pressure on the cover breaks the razor blade along the line of contact of the blade severing element therewith, the severed parts being retained in position by the cover.

2. A chopper for use in severing a razor blade of the double edged type, comprising: an elongated base having a transverse groove, a trough substantially U-shaped in section disposed within said groove, the upper edges of said trough being substantially flush with the upper surface of the base; a pair of locating pins projecting from said base, located on opposite sides of said trough, and laterally offset in opposite directions from the longitudinal axis of the base so as to position the razor blade diagonally with respect to the trough; a cover substantially coextensive with the base and pivotally connected at one end thereof to said base, superposing said blade when the latter is in position on said locating pins; a blade severing element projecting downwardly from the bottom surface of the cover and adapted in one position thereof to clear said trough and in another position to lie within the trough between the vertical portions thereof; and adjustable stop means disposed between the cover and the base, to prevent the severing element from contacting the bottom of the trough; whereby downward pressure on the cover breaks the razor blade along the line of contact of the blade severing element therewith, the severed parts being retained in position by the cover.

HERMAN STOCK.

REFERENCES CITED

The following references are of record in the file of this patent:

UNITED STATES PATENTS

| Number | Name | Date |
|--------|------|------|
| 861,724 | Hillix | July 30, 1907 |
| 2,208,165 | Sheahan | July 16, 1940 |
| 1,403,644 | Scalbom | Jan. 17, 1922 |
| 601,309 | Stevener | Mar. 29, 1898 |
| 1,248,554 | Scalbom | Dec. 4, 1917 |
| 1,228,431 | Hanson | June 5, 1917 |